United States Patent
Chanas et al.

(10) Patent No.: US 7,343,040 B2
(45) Date of Patent: Mar. 11, 2008

(54) METHOD AND SYSTEM FOR MODIFYING A DIGITAL IMAGE TAKING INTO ACCOUNT IT'S NOISE

(75) Inventors: Laurent Chanas, Houilles (FR); Frederic Guichard, Paris (FR); Lionel Moisan, Paris (FR); Bruno Liege, Paris (FR)

(73) Assignee: DO Labs, Boulogne (FR)

( * ) Notice: Subject to any disclaimer, the term of this patent is extended or adjusted under 35 U.S.C. 154(b) by 406 days.

(21) Appl. No.: 10/483,496

(22) PCT Filed: Jun. 5, 2002

(86) PCT No.: PCT/FR02/01908

§ 371 (c)(1),
(2), (4) Date: Jul. 15, 2004

(87) PCT Pub. No.: WO03/007243

PCT Pub. Date: Jan. 23, 2003

(65) Prior Publication Data

US 2004/0247196 A1    Dec. 9, 2004

(30) Foreign Application Priority Data

Jul. 12, 2001   (FR)   .................... 01 09291
Jul. 12, 2001   (FR)   .................... 01 09292

(51) Int. Cl.
*G06K 9/00*   (2006.01)

(52) U.S. Cl. .................... 382/172; 382/254; 382/168; 382/275

(58) Field of Classification Search ................ 382/275, 382/171, 169, 283, 254, 274, 255, 167, 168
See application file for complete search history.

(56) References Cited

U.S. PATENT DOCUMENTS

| | | | | |
|---|---|---|---|---|
| 5,499,057 A | * | 3/1996 | Kondo et al. | ................ 348/607 |
| 5,694,484 A | * | 12/1997 | Cottrell et al. | .............. 382/167 |
| 6,069,982 A | * | 5/2000 | Reuman | ..................... 382/275 |
| 6,115,104 A | * | 9/2000 | Nakatsuka | .................... 355/40 |
| 6,462,835 B1 | * | 10/2002 | Loushin et al. | .............. 358/1.9 |

FOREIGN PATENT DOCUMENTS

EP    0 640 908    3/1995

* cited by examiner

*Primary Examiner*—Samir Ahmed
*Assistant Examiner*—Eric Rush
(74) *Attorney, Agent, or Firm*—Oblon, Spivak, McClelland, Maier & Neustadt, P.C.

(57) ABSTRACT

A system and a method for calculating a transformed image from a digital image and from formatted information related to defects of an appliance chain for image capture and/or restitution. The system and method provide for automatically determining the characteristic noise data from formatted information and/or from the digital image. The transformed image can therefore be corrected such that it does not exhibit any visible or annoying defects, especially defects related to noise, as regards its subsequent use. The system and method are applicable to photographic or video image processing, in optical devices, industrial controls, robotics, metrology, etc.

25 Claims, 9 Drawing Sheets

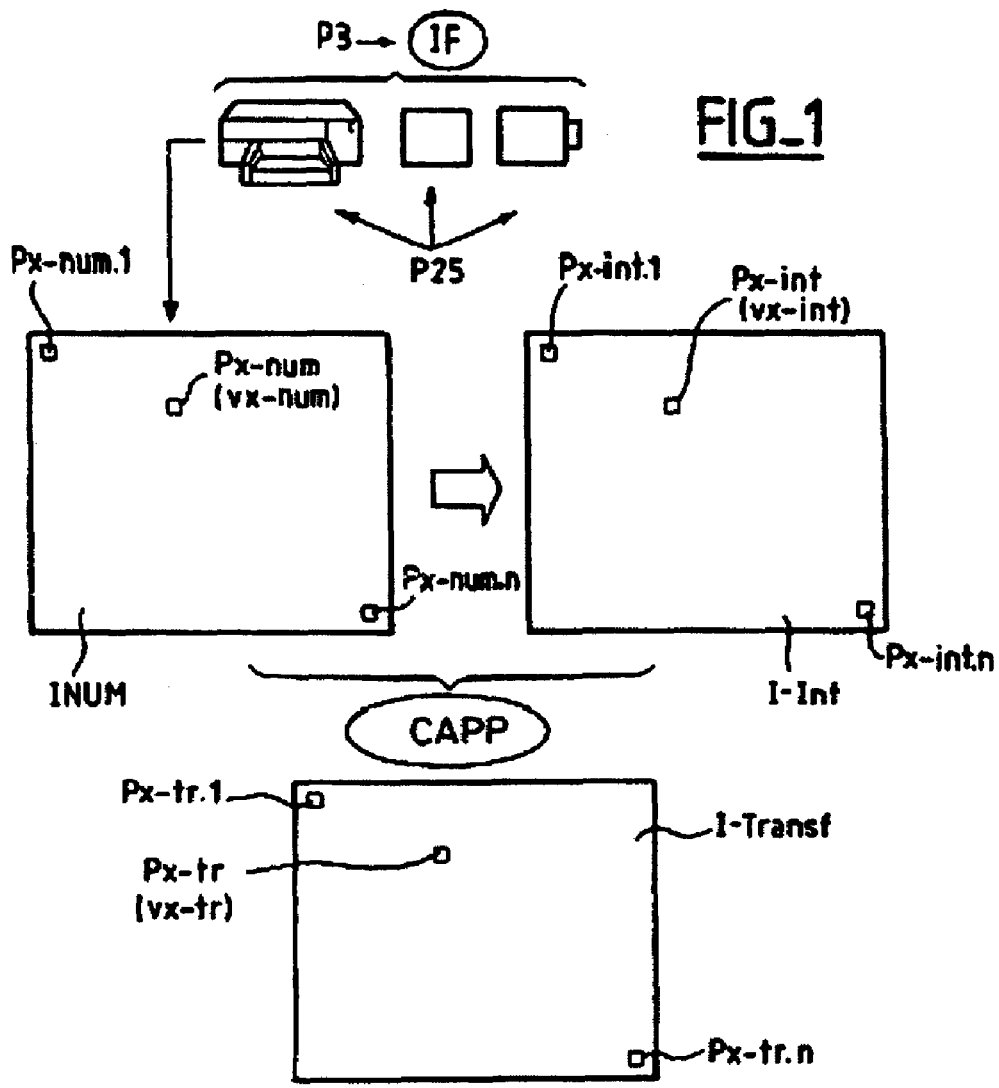
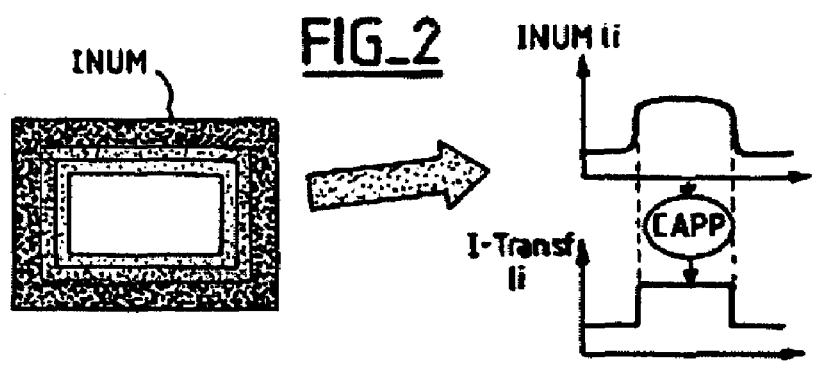

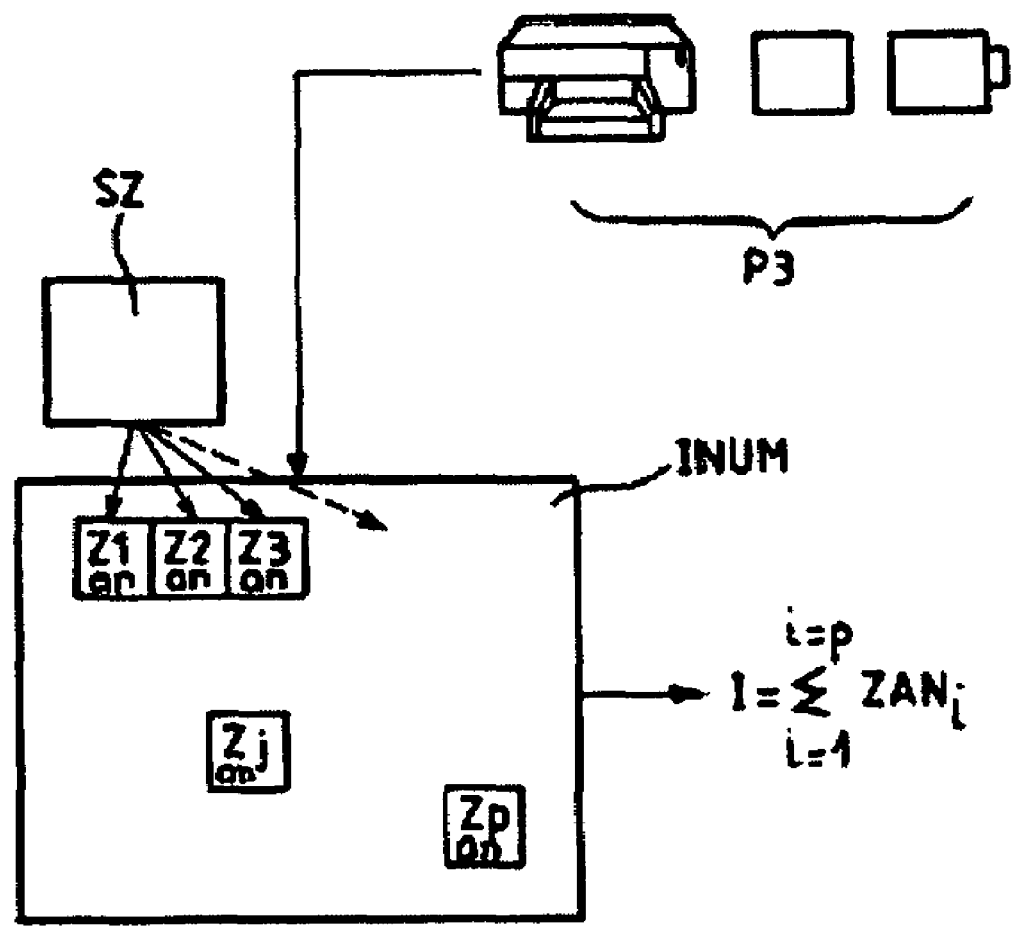
FIG_3

FIG_4a
FIG_4b
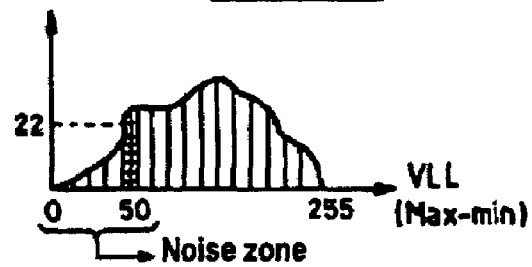
FIG_4c
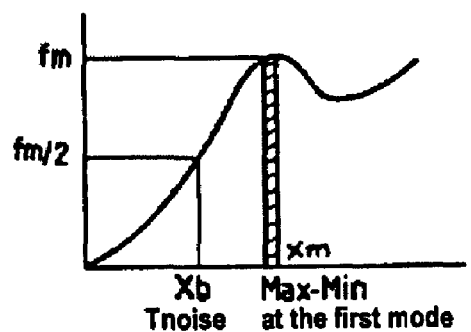
FIG_5
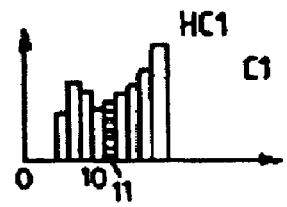
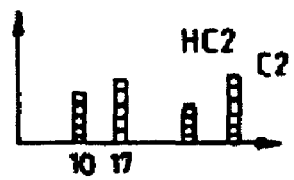

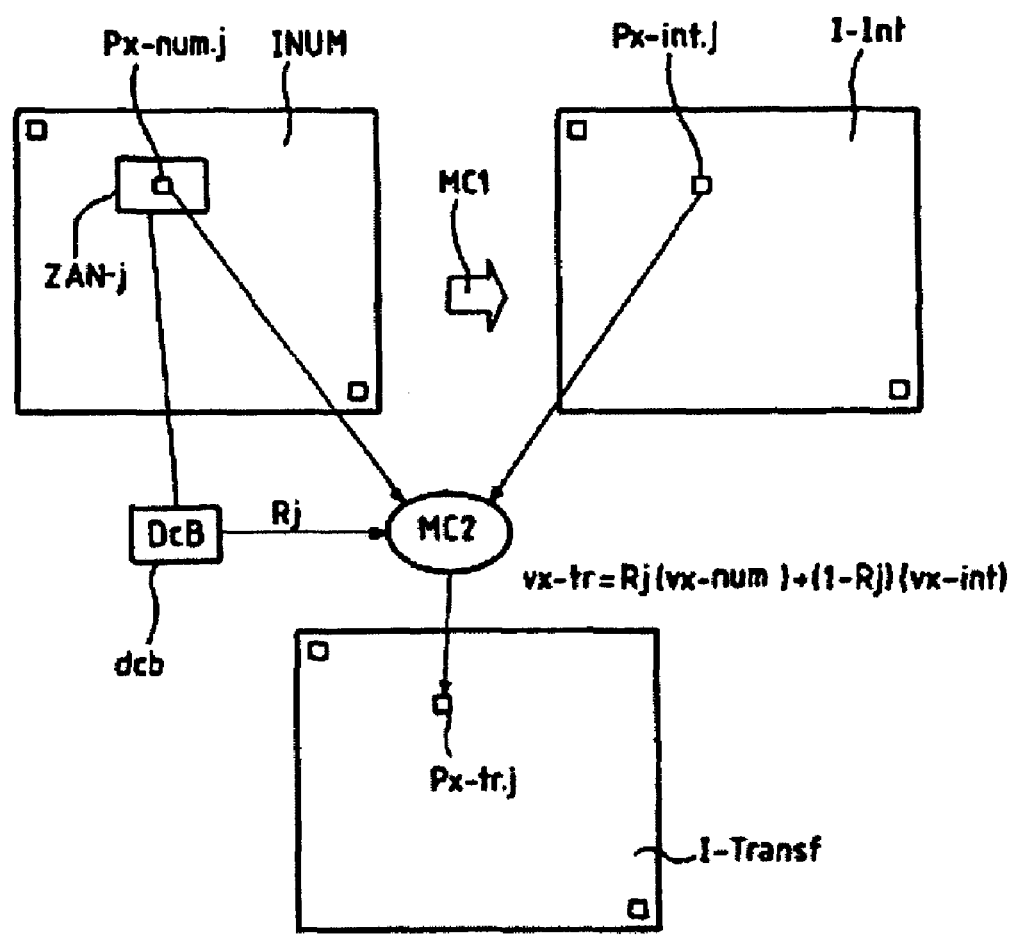
FIG_6

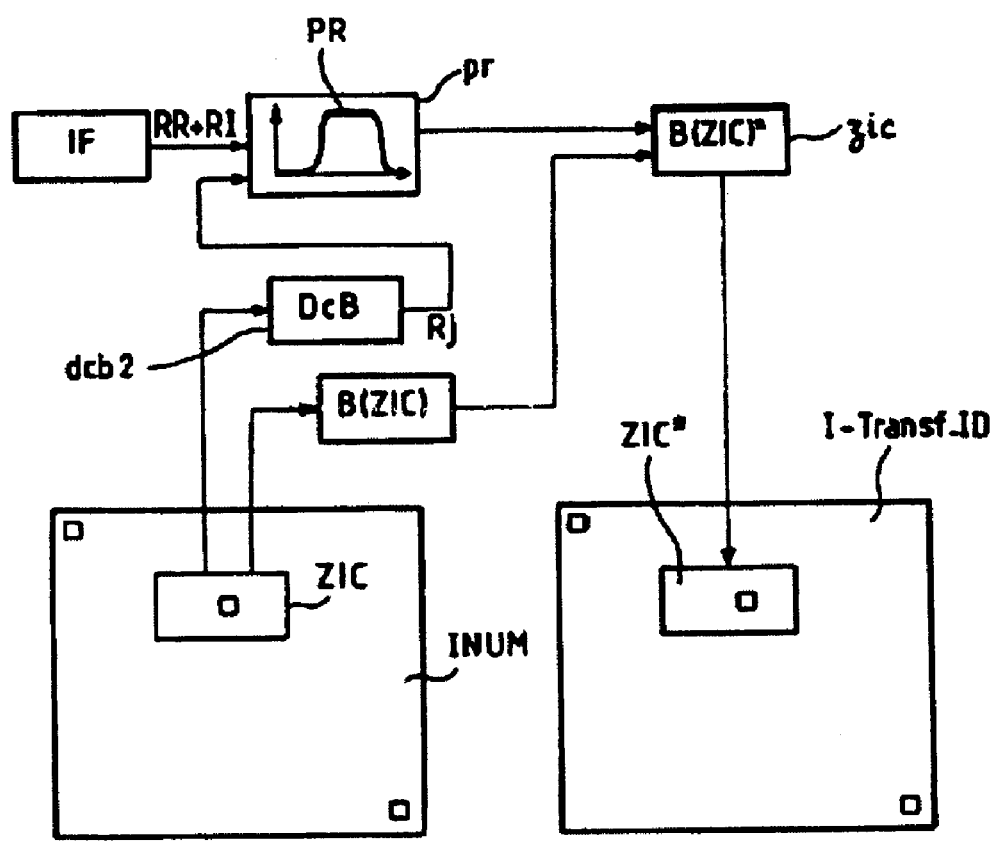
FIG_7a

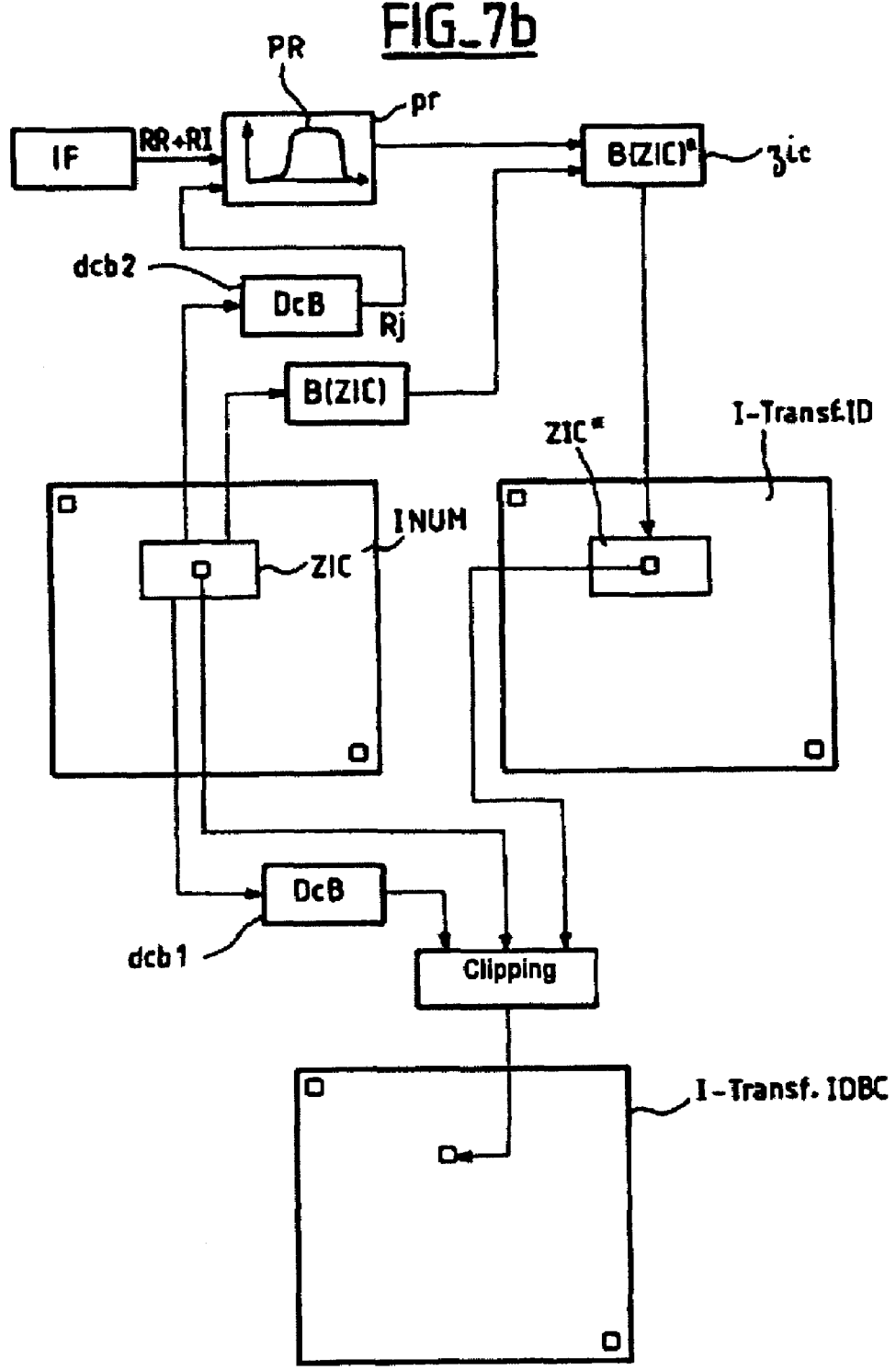

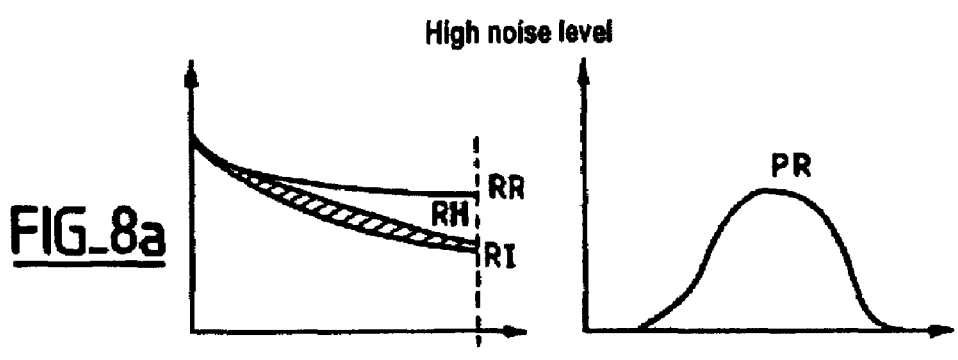
FIG_8a
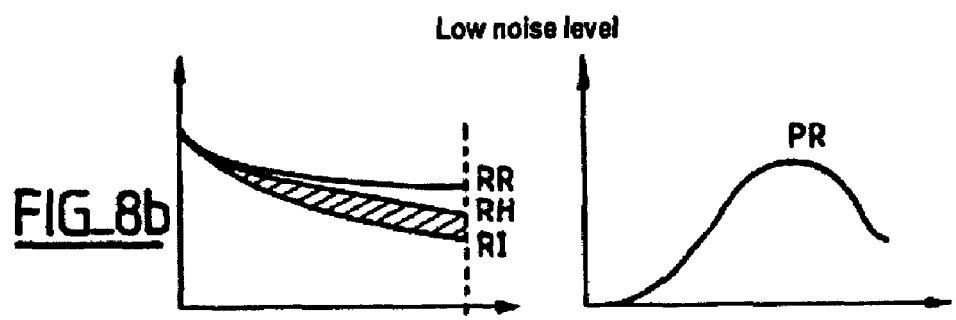
FIG_8b

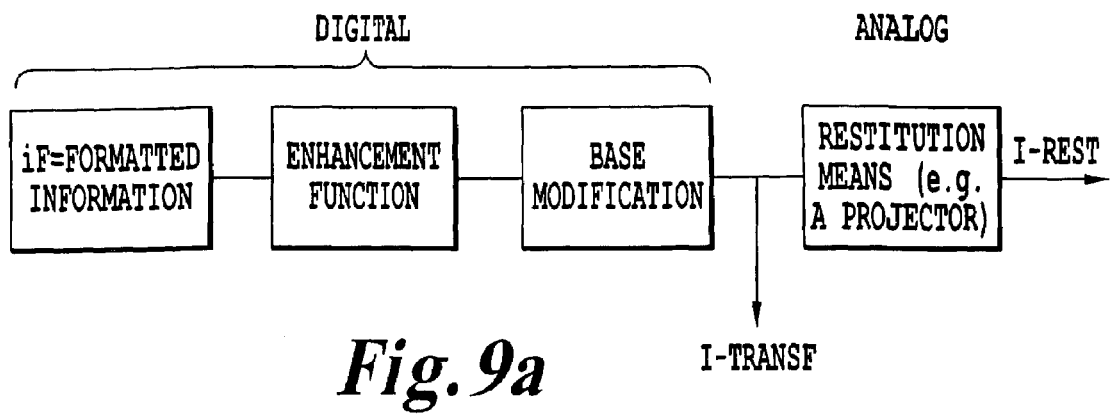
Fig. 9a
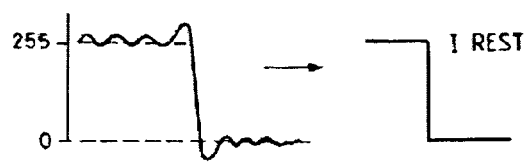
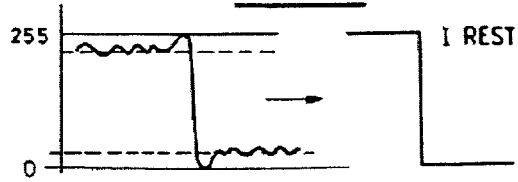

METHOD AND SYSTEM FOR MODIFYING A DIGITAL IMAGE TAKING INTO ACCOUNT IT'S NOISE

PREAMBLE OF THE DESCRIPTION

Field in Question, Problem Posed

The present invention relates to a method and a system for modifying a digital image taking its noise into account.

SOLUTION

Method

The invention relates to a method for calculating a transformed image from a digital image and formatted information related to defects of an appliance chain. The appliance chain contains image-capture appliances and/or image-restitution appliances. The appliance chain contains at least one appliance. The method includes the stage of automatically determining characteristic data from formatted information and/or from the digital image. The characteristic data are referred to hereinafter as the characteristic noise data.

It results from the combination of technical features that the transformed image does not exhibit any visible or annoying defect, especially defects related to noise, as regards its subsequent use.

Estimation of the Noise as a Function of the Image

Preferably, according to the invention, the method additionally includes the following stages for determining the characteristic noise data:
the stage of selecting analysis zones over the digital image, especially as a function of the appliances of the appliance chain and/or of the formatted information,
the stage of calculating local brightness variations over the analysis zones,
the stage of deducing the characteristic noise data as a function of a statistical calculation of occurrence of local variations over the set of analysis zones.

Estimation of the Noise from the Image

Histogram of Brightness Variation

Preferably, according to the invention, the method additionally includes the following stages for deducing the characteristic noise data:
the stage of constructing a histogram of occurrences of local brightness variations,
the stage of selecting, on the histogram, at least one part of the part situated before the first local maximum, including this maximum.

It results from the combination of technical features that the local brightness variations related to the noise are then obtained.

Estimation of the Noise from the Image

Noise as a Function of Brightness

Preferably, according to the invention, the method additionally includes, for selection of analysis zones over the digital image, the stage of classifying the analysis zones according to their mean brightness, in such a way as to obtain classes. The method additionally includes:
the stage of deducing the characteristic noise data for the analysis zones belonging to the same class,
the stage of iterating the preceding stage for each of the classes.

It results from the combination of technical features that characteristic noise data as a function of brightness are then obtained.

Formatted Information that Includes Characteristic Noise Data

Preferably, according to the invention, the formatted information contains the characteristic noise data.

Clipping

Problem Posed

Preferably, according to the invention, the method additionally includes the stage of employing a transformation algorithm for constructing an intermediate digital image. The algorithm has the advantage of making desired modifications to the digital image but suffers from the disadvantage of increasing the noise of the intermediate digital image.

Clipping

Solution

Preferably, according to the invention, to calculate a transformed image from the intermediate digital image obtained from the digital image, the method additionally includes the stage of employing a function whose purpose is to modify the brightness of the digital image and which has, as arguments, at least:
the brightness of a point of the intermediate digital image,
the brightnesses of a zone around the corresponding point of the digital image,
the characteristic noise data.

It results from the combination of technical features that there is then obtained a transformed image exhibiting the desired characteristics and a controlled noise level.

Preferably, according to the invention, the intermediate digital image is composed of the digital image.

Correction of Blurring

Preferably, according to the invention, the method is more particularly designed to calculate a transformed image corrected for all or part of the blurring. The method additionally includes the following stages:
the stage of selecting, within the digital image, image zones to be corrected,
the stage of constructing, for each image zone to be corrected that has been selected in this way, an enhancement profile based on formatted information and on characteristic noise data,
the stage of correcting, as a function of the enhancement profile, each image zone to be corrected that has been selected in this way, in such a way as to obtain a transformed image zone,
the stage of combining the transformed image zones in such a way as to obtain the transformed image of the digital image.

It results from the combination of technical features that a deblurred transformed image is then obtained.

Calculation of the Enhancement Profile

Preferably, according to the invention, the formatted information makes it possible to determine, for each image zone to be corrected, an image representation and a reference representation in a base related to the image zone to be corrected.

The method is such that, to construct an enhancement profile from formatted information and noise, it additionally includes the following stages:
- the stage of determining a profile from the image representation and from the reference representation, while taking the noise into account as the case may be,
- the stage of determining a parameterized operator with which it is possible to pass from the image representation to the profile.

The set of values of parameters of the parameterized operator constitutes the enhancement profile PR.

Correction of Blurring on the Basis of the Enhancement Profile

Preferably, according to the invention, the method additionally includes the following stages for correction of each image zone to be corrected as a function of the enhancement profile:
- the stage of representing at least partly, in the base, the image zone to be corrected,
- the stage of applying the parameterized operator to the representation obtained at the end of the preceding stage, in such a way as to obtain a corrected representation of the image zone to be corrected,
- the stage of substituting the representation of the image zone to be corrected by the corrected representation of the image zone to be corrected, in such a way as to obtain a transformed image zone.

Clipping in the Case of Blurring

Preferably, according to the invention, the method additionally includes the stage of calculating, from the transformed image, an image having a controlled noise level, by employing a function whose purpose is to modify the brightness of the digital image and which has, as arguments, at least:
- the brightness of a point of the transformed digital image,
- the brightnesses of a zone around the corresponding point of the digital image,
- the characteristic noise data.

It results from the combination of technical features that there is then obtained a deblurred image having a controlled noise level.

Variable Characteristics Influencing the Noise and/or the Blurring

The formatted information may depend on values of variable characteristic depending on the digital image, especially the size of the digital image. Preferably in this case according to the invention, the method additionally includes the stage of determining the value or values of the variable characteristics for the digital image.

Thus employment of the method for formatted information including characteristic noise data that depend on variable characteristics depending on the digital image reduces to employment of the method for characteristic noise data that do not depend on any characteristic variable.

Reduction of the Dynamic Range in the Case of a Restitution Appliance

Preferably, according to the invention, the method is more particularly designed to calculate a transformed image from a digital image and from formatted information related to the defects of an appliance chain containing at least one image-restitution appliance. The restitution appliance has a dynamic range. The transformed image has a dynamic range. The method additionally includes the stage of adapting the dynamic range of the transformed image to the dynamic range of the said restitution appliance. It results from the combination of technical features that the restitution of the transformed image by the restitution appliance exhibits reinforced high frequencies. It also results from the combination of technical features that the restitution appliance can restitute images of characters with less blurring.

Correction of Polychromatic Noise and/or Blurring

The invention is applicable to the case of a digital image composed of color planes. The application comprises applying the method according to the invention to each color plane. In this way a transformed image is obtained from the digital image. It results from the combination of technical features that the transformed image exhibits the desired characteristics and a controlled noise level.

System

The invention relates to a system for calculating a transformed image from a digital image and formatted information related to defects of an appliance chain. The appliance chain contains image-capture appliances and/or image-restitution appliances. The appliance chain contains at least one appliance. The system includes data-processing means for automatically determining characteristic data from formatted information and/or from the digital image. The characteristic data are referred to hereinafter as the characteristic noise data.

The transformed image does not exhibit any visible or annoying defect, especially defects related to noise, as regards its subsequent use.

Estimation of the Noise as a Function of the Image

Preferably, according to the invention, the data-processing means for determining the characteristic noise data include:
- selection means for selecting analysis zones over the digital image, especially as a function of the appliance of the appliance chain and/or of the formatted information,
- calculating means for calculating local brightness variations over the analysis zones,
- deducing means for deducing the characteristic noise data as a function of a statistical calculation of occurrence of local variations over the set of analysis zones.

Estimation of the Noise from the Image

Histogram of Brightness Variation

Preferably, according to the invention, the deducing means additionally include:
- means for constructing a histogram of occurrences of local brightness variations,
- selection means for selecting, on the histogram, at least one part of the part situated before the first local maximum, including this maximum.

Estimation of the Noise from the Image

Noise as a Function of Brightness

Preferably, according to the invention, the system additionally includes, for selection of analysis zones over the digital image, classification means for classifying the analysis zones according to their mean brightness, in such a way as to obtain classes. The system additionally includes data-processing means for:
- deducing the characteristic noise data for the analysis zones belonging to the same class,
- iterating the preceding stage for each of the classes.

Formatted Information that Includes Characteristic Noise Data

Preferably, according to the invention, the formatted information contains the characteristic noise data.

Clipping

Problem Posed

Preferably, according to the invention, the system additionally includes data-processing means employing a transformation algorithm for constructing an intermediate digital image. The algorithm has the advantage of making desired modifications to the digital image but suffers from the disadvantage of increasing the noise of the intermediate digital image.

Clipping

Solution

Preferably, according to the invention, to calculate a transformed image from the intermediate digital image obtained from the digital image, the system includes calculating means employing a function whose purpose is to modify the brightness of the digital image and which has, as arguments, at least:
- the brightness of a point of the intermediate digital image,
- the brightnesses of a zone around the corresponding point of the digital image,
- the characteristic noise data.

Preferably, according to the invention, the intermediate digital image is composed of the digital image.

Correction of Blurring

Preferably, according to the invention, the system is more particularly designed to calculate a transformed image corrected for all or part of the blurring. The system additionally includes:
- selection means for selecting, within the digital image, image zones to be corrected,
- calculating means for constructing, for each image zone to be corrected that has been selected in this way, an enhancement profile based on formatted information and on characteristic noise data.

The system additionally includes data-processing means for:
- correcting, as a function of the enhancement profile, each image zone to be corrected that has been selected in this way, in such a way as to obtain a transformed image zone, and for
- combining the transformed image zones in such a way as to obtain the transformed image of the digital image.

Calculation of the Enhancement Profile

Preferably, according to the invention, the formatted information makes it possible to determine, for each image zone to be corrected, an image representation and a reference representation in a base related to the image zone to be corrected. The system is such that the calculating means for constructing an enhancement profile from formatted information and noise additionally include means for determining:
- a profile from the image representation and from the reference representation, while taking the noise into account as the case may be,
- a parameterized operator with which it is possible to pass from the image representation to the profile.

Correction of Blurring on the Basis of the Enhancement Profile

Preferably, according to the invention, the data-processing means for correction of each image zone to be corrected as a function of the enhancement profile include calculating means for:
- representing at least partly, in the base, the image zone to be corrected,
- applying the parameterized operator to the representation of the image zone to be corrected, in such a way as to obtain a corrected representation of the image zone to be corrected,
- substituting the representation of the image zone to be corrected by the corrected representation of the image zone to be corrected, in such a way as to obtain a transformed image zone.

Clipping in the Case of Blurring

Preferably, according to the invention, the system additionally includes calculating means for calculating, from the transformed image, an image having a controlled noise level, by employing a function whose purpose is to modify the brightness of the digital image and which has, as arguments, at least:
- the brightness of a point of the transformed digital image,
- the brightnesses of a zone around the corresponding point of the digital image,
- the characteristic noise data.

Variable Characteristics Influencing the Noise and/or the Blurring

Preferably, according to the invention, the formatted information depends on values of variable characteristics depending on the digital image, especially the size of the digital image. The system additionally includes calculating means for determining the value or values of the variable characteristics for the digital image.

Reduction of the Dynamic Range in the Case of a Restitution Appliance

Preferably, according to the invention, the system is more particularly designed to calculate a transformed image from a digital image and from formatted information related to the defects of an appliance chain containing at least one image-restitution appliance. The restitution appliance has a dynamic range. The transformed image has a dynamic range. The system additionally includes data-processing means for adapting the dynamic range of the transformed image to the dynamic range of the restitution appliance.

BRIEF DESCRIPTION OF THE DRAWINGS

Other characteristics and advantages of the invention will become apparent upon reading of the description of alternative embodiments of the invention, provided by way of indicative and non-limitative examples, and of:

FIG. 1, which illustrates a transformed image calculated from a digital image and an intermediate image, FIG. 2, which illustrates defects of the digital image, FIG. 3, which illustrates a selection of analysis zones over the digital image, FIG. 4a, which illustrates a local brightness variation over an analysis zone, FIG. 4b, which illustrates a histogram of occurrences of local brightness variations, FIG. 4c, which illustrates a part of the histogram situated before the first local maximum of the histogram, FIG. 5, which illustrates classes of analysis zones according to their mean brightness, FIG. 6, which illustrates the modification of brightness of the digital image, FIG. 7a, which illustrates the correction of a transformed image zone as a function of an enhancement profile, FIG. 7b, which illustrates an example of creation of a deblurred image with controlled noise level, FIGS. 8a and 8b, which illustrate the construction of an enhancement profile from the noise, FIGS. 9a, 9b, 9c and 9d, which present the adaptation of the dynamic range of the transformed image to the dynamic range of a restitution appliance.

DETAILED DESCRIPTION

Figure 10:
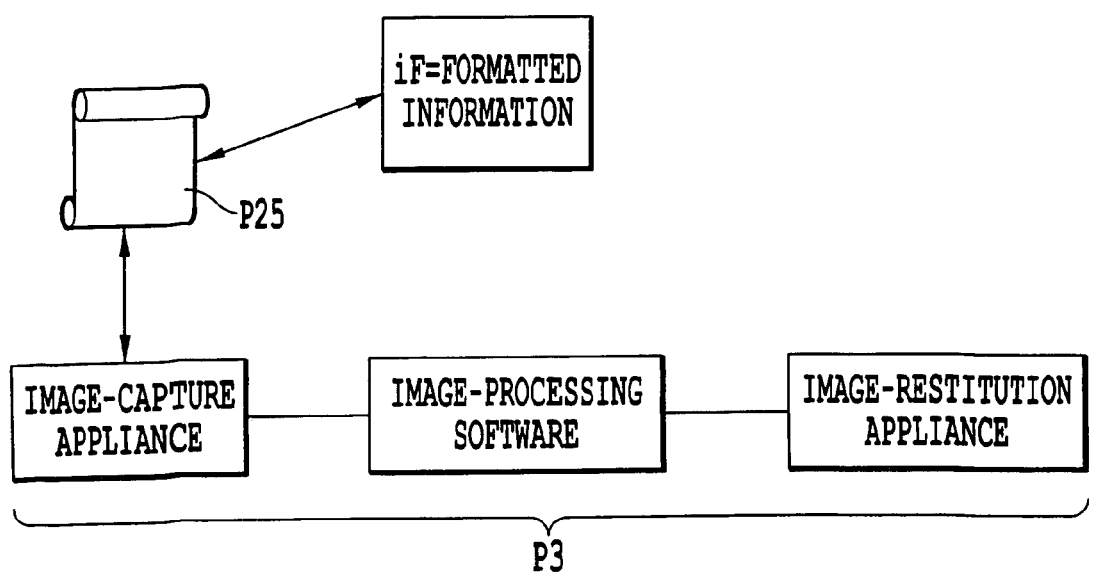
FIG. 10: formatted information IF related to the defects P5 of an appliance P25 of an appliance chain P3.

Referring in particular to FIG. 10, a description will be given of the concept of appliance P25. Within the meaning of the invention, an appliance P25 may be in particular:

an image-capture appliance, such as a disposable photo appliance, a digital photo appliance, a reflex appliance, a scanner, a fax machine, an endoscope, a camcorder, a surveillance camera, a webcam, a camera integrated into or connected to a telephone, to a personal digital assistant or to a computer, a thermal camera or an echographic appliance, an image-restitution appliance, such as a screen, a projector, a television set, virtual-reality goggles or a printer, a human being having vision defects, such as astigmatism, an appliance which it is hoped can be emulated, to produce images having, for example, an appearance similar to those produced by an appliance of the Leica brand, an image-processing device, such as zoom software, which has the edge effect of adding blurring, a virtual appliance equivalent to a plurality of appliances P25, A more complex appliance P25, such as a scanner/fax/printer, a photo-printing. Minilab, or a videoconferencing appliance can be regarded as an appliance P25 or as a plurality of appliances P25.

Appliance Chain

Referring in particular to FIG. 10, a description will now be given of the concept of appliance chain P3. An appliance chain P3 is defined as a set of appliances P25. The concept of appliance chain P3 may also include a concept of order.

The following examples constitute appliance chains P3:
a single appliance P25,
an image-capture appliance and an image-restitution appliance,
a photo appliance, a scanner or a printer, for example in a photo-printing Minilab,
a digital photo appliance or a printer, for example in a photo-printing Minilab,
a scanner, a screen or a printer, for example in a computer,
a screen or projector, and the eye of a human being,
one appliance and another appliance which it is hoped can be emulated,
a photo appliance and a scanner,
an image-capture appliance and image-processing software,
image-processing software and an image-restitution appliance,
a combination of the preceding examples,
another set of appliances P25.

Defect

Referring in particular to FIG. 10, a description will now be given of the concept of defect P5. A defect P5 of appliance P25 is defined as a defect related to the characteristics of the optical system and/or of the sensor and/or of the electronic unit and/or of the software integrated in an appliance P25; examples of defects P5 include distortion, blurring, vignetting, chromatic aberrations, color rendering, flash uniformity, sensor noise, grain, astigmatism and spherical aberration.

Digital Image

Referring in particular to FIG. 10, a description will now be given of the concept of digital image INUM. A digital image INUM is defined as an image captured or modified or restituted by an appliance P25. Digital image INUM may be derived from an appliance P25 of appliance chain P3. Digital image INUM may be addressed to an appliance P25 of appliance chain P3. More generally, digital image INUM may be derived from and/or addressed to appliance chain P3. In the case of animated images, such as video images composed of a time sequence of fixed images, digital image INUM is defined as a fixed image of the image sequence.

Formatted Information

Referring in particular to FIG. 10, a description will now be given of the concept of formatted information IF. Formatted information IF is defined as data related to the defects P5 of one or more appliances P25 of appliance chain P3 and enabling transformed image I-Transf to be calculated by taking into account the defects P5 of appliance P25. The formatted information IF can be produced by using various methods based on measurements, and/or on captures or restitution of references, and/or on simulations.

To produce the formatted information IF, it is possible, for example, to use the method described in the International Patent Application filed on the same day as the present application in the name of Vision IQ and entitled "Method and system for producing formatted information related to defects of at least one appliance of a chain, in particular blurring". That application describes a method for producing formatted information related to the appliances of an appliance chain. The appliance chain is composed in particular of at least one image-capture appliance and/or at least one image-restitution appliance. The method includes the stage of producing formatted information related to the defects of at least one appliance of the chain. The appliance preferably makes it possible to capture or restitute an image (I). The appliance contains at least one fixed characteristic and/or one variable characteristic depending on the image (I). The fixed and/or variable characteristics can be associated with one or more values of characteristics, especially the focal length and/or the focusing and their values of associated characteristics. The method includes the stage of producing, from a measured field D(H) measured formatted information related to the defects of the appliance. The formatted information may include the measured formatted information.

To produce the formatted information IF, it is possible, for example, to use the method described in the International Patent Application filed on the same day as the present application in the name of Vision IQ and entitled "Method and system for providing formatted information in a standard format to image-processing means". That application describes a method for providing formatted information IF in a standard format to image-processing means, especially software and/or components. The formatted information IF is related to the defects of an appliance chain P3. The appliance chain P3 includes in particular at least one image-capture appliance and/or one image-restitution appliance. The image-processing means use the formatted information IF to modify the quality of at least one image derived from or addressed to the appliance chain P3. The formatted information IF includes data characterizing the defects P5 of the image-capture appliance, especially the distortion characteristics, and/or data characterizing the defects of the image-restitution appliance, especially the distortion characteristics.

The method includes the stage of filling in at least one field of the said standard format with the formatted information IF. The field is designated by a field name. The field contains at least one field value.

To search for the formatted information IF, it is possible, for example, to use the method described in the International Patent Application filed on the same day as the present application in the name of Vision IQ and entitled "Method and system for modifying the quality of at least one image derived from or addressed to an appliance chain". That application describes a method for modifying the quality of at least one image derived from or addressed to a specified appliance chain. The specified appliance chain is composed of at least one image-capture appliance and/or at least one image-restitution appliance. The image-capture appliances and/or the image-restitution appliances being progressively introduced on the market by separate economic players belong to an indeterminate set of appliances. The appliances of the set of appliances exhibit defects that can be characterized by formatted information. For the image in question, the method includes the following stages:

- the stage of compiling directories of the sources of formatted information related to the appliances of the set of appliances,
- the stage of automatically searching for specific formatted information related to the specified appliance chain among the formatted information compiled in this way,
- the stage of automatically modifying the image by means of image-processing software and/or image-processing components, while taking into account the specific formatted information obtained in this way.

To produce the formatted information IF, it is possible, for example, to use the method described in the International Patent Application filed on the same day as the present application in the name of Vision IQ and entitled "Method and system for reducing update frequency of image processing means". That application describes a method for reducing the update frequency of image-processing means, in particular software and/or a component. The image-processing means make it possible to modify the quality of the digital images derived from or addressed to an appliance chain. The appliance chain is composed in particular of at least one image-capture appliance and/or at least one image-restitution appliance. The image-processing means employ formatted information related to the defects of at least one appliance of the appliance chain. The formatted information depends on at least one variable. The formatted information makes it possible to establish a correspondence between one part of the variables and of the identifiers. By means of the identifiers it is possible to determine the value of the variable corresponding to the identifier by taking the identifier and the image into account. It results from the combination of technical features that it is possible to determine the value of a variable, especially in the case in which the physical significance and/or the content of the variable are known only after distribution of image-processing means. It also results from the combination of technical features that the time between two updates of the correction software can be spaced apart. It also results from the combination of technical features that the various economic players that produce appliances and/or image-processing means can update their products independently of other economic players, even if the latter radically change the characteristics of their product or are unable to force their client to update their products. It also results from the combination of technical features that a new functionality can be deployed progressively by starting with a limited number of economic players and pioneer users.

Variable Characteristic

A description will now be given of the concept of variable characteristic CC. According to the invention, a variable characteristic CC is defined as a measurable factor, which is variable from one digital image INUM to another that has been captured, modified or restituted by the same appliance P25, and which has an influence on defect P5 of the image that has been captured, modified or restituted by appliance P25, especially:

a global variable, which is fixed for a given digital image INUM, an example being a characteristic of appliance P25 at the moment of capture or restitution of the image, related to an adjustment of the user or related to an automatic function of appliance P25, a local variable, which is variable within a given digital image INUM, an example being coordinates x, y or rho, theta in the image, making it possible to apply, as need be, local processing that differs depending on the zone of the digital image INUM.

A measurable factor which is variable from one appliance P25 to another but which is fixed from one digital image INUM to another that has been captured, modified or restituted by the same appliance P25, is not generally considered to be a variable characteristic CC; an example is the focal length for an appliance P25 with fixed focal length.

The formatted information IF may depend on at least one variable characteristic CC.

By variable characteristic CC there can be understood in particular:
- the focal length of the optical system,
- the redimensioning applied to the image (digital zoom factor: enlargement of part of the image; and/or undersampling: reduction of the number of pixels of the image),
- the nonlinear brightness correction, such as the gamma correction,
- the enhancement of contour, such as the level of deblurring applied by appliance P25,
- the noise of the sensor and of the electronic unit,
- the aperture of the optical system,
- the focusing distance,
- the number of the frame on a film,
- the underexposure or overexposure,
- the sensitivity of the film or sensor,
- the type of paper used in a printer,
- the position of the center of the sensor in the image,
- the rotation of the image relative to the sensor,
- the position of a projector relative to the screen,
- the white balance used,
- the activation of a flash and/or its power,
- the exposure time,
- the sensor gain,
- the compression,
- the contrast,
- another adjustment applied by the user of appliance P25, such as a mode of operation,
- another automatic adjustment of appliance P25,
- another measurement performed by appliance P25.

Variable Characteristic Value

A description will now be given of the concept of variable characteristic value VCC. A variable characteristic value VCC is defined as the value of variable characteristic CC at the moment of capture, modification or restitution of a specified image.

Calculation of the Transformed Image

A digital image INUM contains a set of image elements defined as pixels PX-num.1 to PX-num.n distributed regularly over the surface of image INUM. In FIG. 1, these pixels have the shape of squares, but they could also have any other shape, such as circles or hexagons; that depends on the style of the surfaces designed to carry the image in the appliances for image capture and restitution. In addition, in FIG. 1 the pixels were illustrated as being joined, but in reality some spacing is generally present between the pixels. The associated brightness at an arbitrary point Px-num is vx-num.

Intermediate image I-Int contains a set of pixels similar to that of image INUM, but not necessarily so, defined as intermediate pixels Px-int.1 to Px-int.n. Each intermediate pixel is characterized by an intermediate position Px-int and an intermediate value vx-int.

Transformed image I-Transf also contains a set of pixels defined as transformed pixels PX-tr.1 to PX-tr.n. Each transformed pixel is characterized by a transformed position Px-tr and a transformed value vx-tr.

A transformed image is a corrected or modified image obtained by application of a transformation to an image INUM.

This transformation, which may be a photometric transformation, is performed by incorporating, in the calculation,
- image INUM,
- characteristic noise data DcB in INUM
- image I-Int
  - formatted information that takes into account, for example, defects of the appliances used and/or characteristics that are to be introduced into the image.

It will be noted that the formatted information may be related to a limited number of transformed pixels and/or may incorporate values of variable characteristics that depend on the image (such as the focal length, the focusing, the aperture, etc.). In this case there may exist a supplementary stage which, for example, is performed by interpolation in such a way that it is reduced to simple formatted information such as that of an appliance that is not provided with any variable characteristics, so that the case of appliances with variable focal length in particular reduces to the case of an appliance with fixed focal length.

It will be noted that the formatted information can be related to a limited number of transformed pixels and/or of values of variable characteristics depending on the image. In this case it is possible to include a supplementary stage, which is performed, for example, by interpolation. In the example of a function $x',y'=f(x, y, t)$, where t is a variable characteristic (such as focal length), the formatted information can be composed of a limited number of values (xi, yi, ti, f(xi, yi, ti)). It is then necessary to calculate an approximation for the other values of x, y, t other than the measurement points. This approximation can be applied by resorting to simple interpolation techniques or by using parameterizable models (polynomials, splines, Bezier functions) having greater or lesser order depending on the desired final precision. With an analogous formalism, t could be a vector and could include a plurality of variable characteristics (focal length, focusing, zoom, etc.) simultaneously.

In the case of noise and/or of blurring, the formatted information could be composed if necessary of vectors with which the noise and/or the blurring related to an appliance and/or to an appliance chain can be characterized, for the set of combinations of variable parameters of the device, especially by resorting to characteristic profiles of the defect in special representation bases, especially frequency representations such as Fourier transforms, wavelet transforms, etc. In fact, the person skilled in the art knows that frequency representations are compact domains that are appropriate for representation of physical phenomena related to noise and/or to blurring.

It is additionally possible to combine the formatted information IF related to a plurality of appliances P25 of an appliance chain P3 to obtain formatted information related to a virtual appliance exhibiting the defects of the said plurality of appliances P25; in such a way that it is possible to calculate, in one stage, transformed image I-Transf from image INUM for all of the said plurality of appliances P25; in such a way that the said calculation is faster than if the method according to the invention were to be applied successively to each appliance P25; in the example of a frequency representation such as the Fourier transform, the said combination can be achieved cumulatively from the characteristic profiles of the defect of each appliance, for example by multiplication.

It will be possible for the formatted information to include not only data that were studied in a preliminary phase and that are related to the appliances used, but also all information styled in the Exif or other format that could provide particulars on the adjustments of the appliance at the moment of filming (focal length, focusing, aperture, speed, flash, etc.).

Let us assume that digital image INUM represents, for example, capture of the monochromatic image of a white square on a black background. FIG. 2 illustrates the brightnesses of a line of image INUM. Because of the noise and/or blurring generated by the capture and/or restitution chain, the ideal profile (a step of a staircase) is deformed. The method of the invention makes it possible, by means of calculating means CAPP that incorporate approximations according to a desired final precision, among other factors, to obtain, on transformed image I-Transf, a square in which the brightness value vx-tr at each of the points px-tr is effectively corrected to within the approximations.

We note that the application of algorithm CAPP may, in the case of noise and/or blurring, reduce original image INUM to a perfect or quasi-perfect image. The same algorithm may also reduce image INUM to another image, which may be deformed, albeit differently, in such a way as to produce an image closely resembling a known type of image noise and/or blurring (retro noise effect, etc.). The same method also makes it possible to reduce image INUM to an image that is not perfect (in the sense of a white square on a black background, as in FIG. 2) but is optimal to the eyes of the observer, such that it is possible to compensate if necessary for defects of perception of the human eye.

Estimation of the Noise

For certain types of appliance APP, especially for image capture, it is possible to deduce characteristic noise data DcB from formatted information. For example, this is the case in particular for appliances with which it is possible to determine particulars of variable characteristics that influence noise, such as gain, ISO, etc. The dependence between noise and these characteristics will be entered into the formatted information, especially by means of polynomial functions.

To the extent that characteristic noise data cannot be deduced directly or indirectly from formatted information, it will be necessary to deduce these characteristic data. We will therefore describe, within the meaning of the present invention, a practical example with which there can be produced characteristic noise data DcB that are related to an image INUM.

Image INUM is subdivided into a series of analysis zones (ZAN), which are not necessarily joined and which may intersect as the case may be. FIG. 3 illustrates an example of subdivision. An analysis zone ZAN may have an arbitrary shape, and it is not absolutely necessary to analyze all of the points inscribed in the said analysis zone ZAN. For each analysis zone ZAN, such as a square window with a size of 3×3 or 5×5 pixels, the method undertakes a measurement of local brightness variation (VLL). The set of measurements of local brightness variations for all analysis zones ZAN is then analyzed statistically to produce one or more characteristic noise data DcB related to image INUM.

An example of measurement of local brightness variation VLL can be achieved by calculating, over an analysis zone ZAN, the maximum brightness deviation among the set of points. In FIG. 4a, VLL has a value of 29, which represents the maximum deviation between two pixels of the zone. Another way could be to calculate the standard deviation of the distribution relative to the brightness variation.

It is possible to analyze the set of measurements of local brightness variation VLL statistically by creating a histogram of frequencies of occurrence of the variations. In such a histogram, an example of which is illustrated in FIG. 4b, the abscissa represents a quantization of the brightness deviations VLL according to the precision of noise measurement. The ordinate represents the total number of occurrences of an analysis zone ZAN giving the value VLL. In the example, there were 22 analysis zones ZAN for which the measurement of local brightness variation gave the value 50.

The profile of this histogram for a natural image, such as a landscape image containing a random distribution of patterns of different brightness but having homogeneous brightness over small analysis zones, contains a characteristic zone situated before the first local maximum (FIG. 4b, 4c). Assuming that a natural image contains a large number of zones of reduced size (size of an analysis zone ZAN) for which the illumination is quasi-uniform, then the first local maximum of the histogram (with abscissa xm and ordinate fm) characterizes the mean noise of image INUM. For the image with very little noise, we will have many measurements VLL exhibiting small brightness deviations, and the abscissa of the first mode will be close to the origin; in contrast, if the image incorporates much noise derived from different appliances of the chain, each measurement VLL performed on theoretically homogeneous zones will generate high values and will shift the abscissa of the first mode of the histogram away from the origin.

The characteristic noise data of image INUM may be composed of the set of values of the histogram up to the first mode. Another way of extracting more synthetic information from the noise characteristic comprises, as illustrated in FIG. 4c, defining a mean noise value BM as being that abscissa xb, located between the origin and the first mode of the histogram (xm), for which the ordinate is a fraction (typically half) of fm.

FIG. 5 illustrates an alternative version of the calculation of characteristic noise data DcB. According to an analogous procedure for analysis of analysis zones ZAN, the invention provides for simultaneously estimating, at the local brightness variation VLL, information related to the mean brightness in the said analysis zone ZAN (for example, the algebraic mean of the brightnesses over the zone). The method also provides, as a function of the quantization of image brightness, for creation of classes that subdivide the brightness scale linearly or nonlinearly. For quantization on 8 bits, the maximum number of classes is 255; typically we will use between 5 and 10 classes (C1 . . . Cn) of brightness subdivision. In a practical example of the method, it will be possible for the choice of subdivision to be a function of the brightness histogram of image INUM. To each class there will correspond a histogram of cumulative frequency of occurrence of a VLL, in such a way that the noise contained in image INUM is analyzed by brightness interval.

In FIG. 5 we described three examples of analysis zone ZAN for an analysis of noise characteristics in three classes. For zone ZAN-i, the mean brightness is 5.8, and so this zone belongs to class C1 and the measurement of VLL (which is equal to 11) will therefore be accumulated in histogram HC1 related to C1. An analogous procedure is carried out for analysis zones ZAN-j and ZAN-p which, in view of their measurement of mean brightness, belong respectively to classes C2 and C3. When all analysis zones ZAN constituting image INUM have been analyzed, we will have as many histograms as there are classes. By analogy with the foregoing description, it is possible to extract one characteristic value of noise per histogram and therefore per class, and thus to compose a set of characteristic noise data DcB=[(C1, BM1), (C2, BM2), . . . , (Cn, BMn)] of INUM.

Clipping

Let us consider a digital image INUM within the meaning of the present invention, and let us also consider a transformation applicable to an INUM in such a way as to construct an intermediate image which, in certain respects, has the advantage of making the desired modifications but, on the other hand, suffers from the disadvantage of increasing the image noise in certain zones. As we will see hereinafter, it will be possible for this transformation to be a transformation that reduces blurring, a transformation that increases contrast, a transformation with which image mosaics can be created, or any other transformation capable of modifying the noise characteristics between image INUM and I-Int. The method illustrated in FIG. 6 is defined as clipping, which is to be understood within the scope of the invention as the taking of portions of images. Calculation of the brightness vx-tr of a transformed pixel Px-tr-j requires information related to:

pixel Px-num-j and an analysis zone ZAN-j around the point, pixel Px-int-j, characteristic noise data DcB.

The analysis of the mean brightness and of the local brightness variation VLL in zone ZAN-j makes it possible to determine class Cj to which the noise belongs and to extract the data DcB of noise BM-j. According to one option, it is possible to calculate a normalized ratio Rj between BM-j and VLL. As illustrated in FIG. 6, if Rj tends to 1 (case in which the local brightness variation VLL is substantially on the same order as BM-j, and so what is being measured is the noise), then the brightness vx-tr of transformed pixel Px-tr-j is taken for the most part in INUM. The brightness value of a transformed pixel can then be expressed as a function of pixel brightness vx-num, of pixel brightness vx-int and of the characteristic noise data. One special case may be the following rule:

$$vx\text{-}tr = (Rj)vx\text{-}num + (1-Rj)vx\text{-}int$$

where vx-num and vx-int represent the brightnesses of Px-num-j and Px-int-j respectively. In the opposite case (the local brightness variation VLL is large compared with BM-j, thus corresponding to the signal), the ratio Rj tends to 0 and the brightness vx-tr of transformed pixel Px-tr-j is taken for the most part in intermediate image I-Int.

More generally, the brightness value of a transformed pixel can be expressed as a function of the brightnesses of pixel vx-num and its neighbors, of the brightnesses of pixel vx-int and its neighbors and finally of the characteristic noise data.

It will therefore be possible, for example, to deduce the transformed image from the intermediate image by applying a more or less intensive filtering operation in the latter on the basis of noise measured in INUM.

This method has the advantage that it takes, in the intermediate image, only information that is pertinent to the exclusion of points for which the noise analyzed in original image INUM is too large within the meaning of a global statistical study of noise characterized by the data DcB.

It is understood that it is possible, during the clipping operation, to apply any relation, especially linear or nonlinear transformations, for passage between the images INUM and I-Int.

In FIG. 3, the system according to the invention contains a device SZ for selection of analysis zones. In FIG. 6, it contains a calculating device MC1 for calculating an intermediate pixel from a pixel Pi of image INUM. Furthermore, a calculating device dcb makes it possible to calculate the characteristic noise data DcB and to provide a coefficient Rj. By means of calculating device MC2 it is possible to calculate the value of a transformed pixel, or in other words its brightness, from the values of digital and corresponding intermediate pixels and from coefficient Rj.

Correction of Blurring

We will now describe a practical example of a method designed more particularly to calculate a transformed image corrected for all or part of the blurring. The description of this method is based on the practical example of the system shown in FIG. 7a. Digital image INUM is subdivided into image zones ZIC to be corrected. The set of these zones covers the entirety of image INUM and, as the case may be, it is possible for these zones to overlap if necessary in order to reduce certain perturbing effects better known to the person skilled in the art by the term edge effect. The creation of a transformed image zone ZIC* corrected for the blurring defect employs a process that requires the following parameters, but is not limited thereto, as argument:

knowledge, at the moment of filming, of values of variable parameters of the appliance or of the appliance chain for image capture and/or restitution, the brightness at each point Px-num belonging to zone ZIC, the characteristic noise data DcB of INUM, the formatted information related to modeling of the blurring of the appliance and/or of the appliance chain, if necessary modeled beforehand by means of a parameterizable model.

For a configuration of given arguments (focal length, focusing, zoom, aperture, etc., DcB, zone ZIC), it is possible, by means of the parameterizable model of formatted information, to access characteristic blurring profiles related to an image representation RI and a reference representation RR. These profiles are expressed in a particular base, especially a frequency base B, by using, for example, a Fourier transform, a wavelet transform, etc.

Base B will be implicit or else will be established within the formatted information. Within the meaning of the present invention, the person skilled in the art sees that it is possible to represent a digital image (such as INUM) in a vector space of dimension equal to the number of pixels. By base B there is understood, non-exclusively, a base, in the mathematical sense of the term, of this vector space and/or a vector subspace thereof.

Hereinafter, frequency is defined as an identifier related to each element of the base. The person skilled in the art understands Fourier transformations and/or wavelet transforms as changes of the base of the image space. In the case of an appliance APP for which the blurring defects significantly affect only a subspace of the vector space of the images, it will be necessary to correct only those components of image INUM that belong to this subspace. Thus base B will be chosen preferably as a base for representation of this subspace.

Another way of employing the method within the meaning of the invention is to choose, for representation of the image, a base that is optimal within the meaning, for example, of that of calculation time. It will be possible to choose this base with small dimension, each element of the base having a support of a few pixels spatially localized in image INUM (for example, splines or sets of Laplace operators of local variations, Laplacian of Laplacian, or derivatives of higher order, etc.).

The measurement of the local brightness variation VLL over zone ZIC makes it possible, by virtue of the characteristic noise data DcB of INUM, to calculate a coefficient Rj (device dcb2). This coefficient will be coupled with the representations RI and RR (device pr) to generate a frequency-based enhancement profile PR related to zone ZIC. This profile indicates the gain to be applied at each frequency related to the brightness information contained in zone ZIC to be corrected, in order to suppress all or part of the blurring.

FIG. 7a shows that it is then sufficient to express zone ZIC in a base B, especially an adequate frequency base B(ZIC), to apply the enhancement function for all or part of the frequencies. B(ZIC*)=B(ZIC)*PR, and then, by an inverse transform, to find the transformed image zone. The set of transformed image zones is then combined in such a way as to obtain the deblurred transformed image (I-Transf ID). By means of this combination it is possible, for example, to apply solutions in the case of overlap of ZIC, especially to limit the edge effects.

Creation of the image (I-Transf ID) as described in the foregoing has the advantage of applying the necessary modifications to image INUM from the viewpoint of blurring, but suffers from the disadvantage of increasing the noise in certain zones (especially relatively uniform zones).

A second employment of a method of the present invention is based on the practical example of the system shown in FIG. 7b. It makes it possible to construct a deblurred image (I-Trans IDBC) having a controlled noise level. Creation of the transformed image (I-Transf IDBC) employs a clipping procedure similar to that described hereinabove in FIG. 6, by means of device dcb1 and of the clipping device. In this present case, the intermediate image as defined in FIG. 6 is nothing other than the deblurred image (I-Trans ID).

FIG. 8 describes more precisely the production of enhancement profile PR for a specified zone ZIC. The image representation RI and reference representation RR that have been extracted from formatted data and that are related to an image zone ZIC to be corrected are characteristic of the blurring introduced by the acquisition and/or restitution system for a given configuration of variable parameters at the moment of filming (focal length 10 mm, focusing at infinity, aperture f/2, etc.). These representations RR and RI express the following concepts:

RI is the frequency profile of a zone ZIC of a reference scene as generated by the device and containing blurring, RR is the optimal frequency profile of the same zone ZIC as it would have been generated if the device had not generated blurring.

We see that the ratio between these two profiles can indicate the gain for each frequency to be applied to RI to find RR. On the other hand; it turns out that direct application of the calculated gain between RI and RR can generate undesirable behaviors, especially with high frequencies, when zone ZIC to be corrected contains a high noise level. These phenomena are known by the person skilled in the art as the effect of brightness oscillations defined as "ringing". According to the invention, the method will estimate, between RR and RI, a profile whose position is parameterized as a function of the noise in analyzed zone ZIC.

FIGS. 8a and 8b show two examples of profiles PR that can be generated according to the invention. The deviation between profiles RI and RR shows the frequency loss introduced by the blurring inherent to the device.

FIG. 8a treats the case of high noise level in zone ZIC; it will be advisable to choose, between RI and RR, a profile RH such that its effect is less at the high frequencies (the end of RH will coincide with RI), which in this case carry the information related to the noise in the image.

In contrast, FIG. 8b treats the case of very low noise level in zone ZIC; the high frequencies of profile RI therefore represent the signal and no longer the noise. It will then be advisable to choose, between RI and RR, a profile. RH such that the gain between RH and RI remains large even at the high frequencies, in order to reinforce the perception of details in zone ZIC.

In any case, RH will not be permitted to exceed RR, which is the ideal profile of the device but does not correspond to an image that can be constructed by a real device. In view of the foregoing description, it is possible to choose multiple functions that parameterize a curve of profile RH between RI and RR. In FIGS. 8a, 8b, the representation base chosen for representations RR and RI is the Fourier base. The abscissa represents the signal frequencies and the ordinate represents the logarithm of the modulus of the Fourier transform. One approach in particular to calculation of a representation of profile. RH is to remain tangential to profile RR at low frequency and then (FIGS. 8a, 8b) to follow a straight line up to the extreme point characterizing the high frequencies.

Construction of the frequency-based enhancement profile PR is performed immediately by calculation of the ratio RH/RI for all frequencies.

Correction of Polychromatic Noise and/or Blurring

The method of the invention is applicable to the processing of color images. From the viewpoint of image-processing software, a color image is considered to contain as many images (or color planes) as there are basic colors in the image. Thus an image IMrgb is considered to be composed of the three color planes Im-red, Im-green, Im-blue. Analogously, an image IMcmyk may be considered to be composed of four color planes: Im-cyan, Im-magenta, Im-yellow, Im-black. In the method described in the foregoing, each color plane will be processed independently in such a way as to obtain n transformed images, which will recompose the different color planes of the transformed final image.

Reduction of the Dynamic Range Upstream from a Restitution Appliance

The method of the invention is applicable to calculation of a transformed digital image I-Transf designed to be displayed via a restitution means of known dynamic range (FIG. 9a) in order to create an image I-REST. This restitution means, such as a projector, intrinsically introduces blurring at the moment of restitution, and this may be manifested in FIG. 9b, for example, by attenuation of the profile of a transition in the form of a staircase step. In order to obtain a more favorable restitution, it will be advisable (FIG. 9c) to modify the dynamic range of the transformed image upstream in such a way that the projected image will have a profile closer to the ideal profile. This modification of dynamic range is not always feasible, because of the quantization of the transformed image (generally in 8 bits). To alleviate this difficulty, the method can reduce the global dynamic range of the transformed image (the image becomes less contrasted, and therefore less energetic). It is possible to apply thereto the transformations necessary to take into account the blurring of the restitution appliance, while remaining within the permissible dynamic range of the image (FIG. 9c) and, in the case of a lamp-type projector appliance, to compensate for the energy drop at the level of the restitution appliance itself, which no longer has a quantization problem, by increasing, for example, the energy of the lamps (FIG. 9d). It results from this combination of technical means that the restitution appliance is able to restitute images, especially characters, with less-blurred details.

Application of the Invention to Cost Reduction

Cost reduction is defined as a method and system for lowering the cost of an appliance P25 or of an appliance chain P3, especially the cost of the optical system of an appliance or of an appliance chain, the method consisting in:
reducing the number of lenses, and/or
simplifying the shape of the lenses, and/or
designing an optical system having defects P5 that are larger than those desired for the appliance or the appliance chain, or choosing the same from a catalog, and/or
using materials, components, processing operations or manufacturing methods that are less costly for the appliance or the appliance chain and that add defects P5.

The method and system according to the invention can be used to lower the cost of an appliance or of an appliance chain: it is possible to design a digital optical system, to produce formatted information IF related to the defects P5 of the appliance or of the appliance chain, to use this formatted information to enable image-processing means, whether they are integrated or not, to modify the quality of images derived from or addressed to the appliance or to the appliance chain, in such a way that the combination of the appliance or the appliance chain with the image-processing means is capable of capturing, modifying or restituting images of the desired quality at reduced cost.

The invention claimed is:

1. A method for obtaining a transformed image from a digital image of an appliance chain, comprising:
automatically determining characteristic noise data from formatted information related to a defect of the appliance chain and/or from the digital image; and
calculating the transformed image from the formatted information and from the characteristic noise data wherein
the transformed image does not exhibit a visible defect related to noise, and
the step of automatically determining the characteristic noise data includes:
selecting an analysis zone over the digital image as a function of an appliance of the appliance chain and/or the formatted information,
calculating local brightness variations over the analysis zone, and
determining the characteristic noise data by constructing a histogram of occurrences of the local brightness variations over the analysis zone, and selecting on the histogram at least one part of a part situated before a first local maximum such that local brightness variations related to the noise are obtained.

2. A method according to claim 1, the method further comprising, for selection of analysis zones over the digital image, classifying the analysis zones according to their mean brightness, to obtain classes;
the method further comprising:
deducing the characteristic noise data for the analysis zones belonging to a same class;
iterating the deducing for each of the classes;
such that characteristic noise data as a function of brightness are then obtained.

3. A method according to claim 1, wherein the formatted information contains the characteristic noise data.

4. A method according to claim 1, the method further comprising employing a transformation algorithm for constructing an intermediate digital image;
the algorithm having an advantage of making desired modifications to the digital image but suffering from a disadvantage of increasing the noise of the intermediate digital image.

5. A method according to claim 4, to calculate a transformed image from the intermediate digital image obtained from the digital image, the method further comprising:
employing a function whose purpose is to modify brightness of the digital image and which has, as arguments, at least:
the brightness of a point of the intermediate digital image,
the brightnesses of a zone around the corresponding point of the digital image,
the characteristic noise data;
such that there is then obtained a transformed image exhibiting the desired characteristics and a controlled noise level.

6. A method according to claim 5, wherein the intermediate digital image is composed of the digital image.

7. A method according to claim 1, wherein the method calculates a transformed image corrected for all or part of the blurring, the method further comprising:
selecting, within the digital image, image zones to be corrected,
constructing, for each image zone to be corrected that has been selected, an enhancement profile based on the formatted information and on the characteristic noise data,
correcting, as a function of the enhancement profile, each image zone to be corrected that has been selected, to obtain a transformed image zone,
combining the transformed image zones to obtain the transformed image of the digital image;
such that a deblurred transformed image is then obtained.

8. A method according to claim 7, wherein the formatted information makes it possible to determine, for each image zone to be corrected, an image representation and a reference representation in a base related to the image zone to be corrected, the method to construct an enhancement profile from formatted information and noise, the method further comprising:
determining a profile from the image representation and from the reference representation, while taking the noise into account as the case may be,
determining a parameterized operator with which it is possible to pass from the image representation to the profile;
such that the set of values of parameters of the parameterized operator constitutes the enhancement profile.

9. A method according to claim 8, the method further comprising, for correction of each image zone to be corrected as a function of the enhancement profile:
representing at least partly, in the base, the image zone to be corrected,
applying the parameterized operator to a representation obtained at an end of the representing to obtain a corrected representation of the image zone to be corrected,
substituting the representation of the image zone to be corrected by the corrected representation of the image zone to be corrected, so as to obtain a transformed image zone.

10. A method according to claim 7, the method further comprising:
calculating, from the transformed image, an image having a controlled noise level, by employing a function whose purpose is to modify brightness of the digital image and which has, as arguments, at least:
brightness of a point of the transformed digital image,
brightnesses of a zone around the corresponding point of the digital image,
characteristic noise data;
such that there is then obtained a deblurred image having a controlled noise level.

11. A method according to claim 1, wherein the formatted information depends on values of variable characteristics depending on the digital image, the method further comprising:
determining the value or values of the variable characteristics for the digital image.

12. A method according to claim 1, the method configured to calculate a transformed image from a digital image and from formatted information related to the defects of an appliance chain containing at least one image-restitution appliance, the restitution appliance having a dynamic range, the transformed image having a dynamic range, the method further comprising adapting the dynamic range of the transformed image to the dynamic range of the restitution appliance.

13. Application to a case of a digital image composed of color planes, the application comprising applying, to each color plane, the method according to claim 1.

14. A system for obtaining a transformed image from a digital image of an appliance chain, comprising:
data-processing means for automatically determining characteristic noise data from formatted information related to defects of the appliance chain and/or from the digital image;
computer processing means for calculating the transformed image from the formatted information and from the characteristic noise data wherein the transformed image does not exhibit a visible defect related to noise, and
the data-processing means for automatically determining the characteristic noise data includes:
means for selecting an analysis zone over the digital image as a function of an appliance of the appliance chain and/or the formatted information,
means for calculating local brightness variations over the analysis zone, and
means for determining the characteristic noise data by constructing a histogram of occurrences of the local brightness variations over the analysis zone, and selecting on the histogram at least one part of a part situated before a first local maximum such that local brightness variations related to the noise are obtained.

15. A system according to claim 14, the system further comprising:
for selection of analysis zones over the digital image, classification means for classifying the analysis zones according to their mean brightness, to obtain classes;
the system further comprising data-processing means for:
deducing the characteristic noise data for the analysis zones belonging to a same class,
iterating the deducing for each of the classes.

16. A system according to claim 14, wherein the formatted information contains the characteristic noise data.

17. A system according to claim 14, the system further comprising data-processing means employing a transformation algorithm for constructing an intermediate digital image;
the algorithm having an advantage of making the desired modifications to the digital image but suffering from a disadvantage of increasing the noise of the intermediate digital image.

18. A system according to claim 17, to calculate a transformed image from the intermediate digital image obtained from the digital image, the system further comprising:
calculating means employing a function whose purpose is to modify brightness of the digital image and which has, as arguments, at least:
the brightness of a point of the intermediate digital image,
the brightnesses of a zone around the corresponding point of the digital image,
the characteristic noise data.

19. A system according to claim 18, wherein the intermediate digital image is composed of the digital image.

20. A system according to claim 14, wherein the system calculates a transformed image corrected for all or part of blurring, the system further comprising:
selection means for selecting, within the digital image, image zones to be corrected,
calculating means for constructing, for each image zone to be corrected that has been selected, an enhancement profile based on the formatted information and on the characteristic noise data,
data-processing means for:
correcting, as a function of the enhancement profile, each image zone to be corrected that has been selected, to obtain a transformed image zone, and for
combining the transformed image zones to obtain the transformed image of the digital image.

21. A system according to claim 20, wherein the formatted information makes it possible to determine, for each image zone to be corrected, an image representation and a reference representation in a base related to the image zone to be corrected;

wherein in the system the calculating means for constructing an enhancement profile from formatted information and noise further comprises means for determining:

a profile from the image representation and from the reference representation, while taking the noise into account as the case may be, a parameterized operator with which it is possible to pass from the image representation to the profile.

22. A system according to claim 21, wherein the data-processing means for correction of each image zone to be corrected as a function of the enhancement profile comprising calculating means for:

representing at least partly, in the base, the image zone to be corrected, applying the parameterized operator to the representation of the image zone to be corrected, to obtain a corrected representation of the image zone to be corrected, substituting the representation of the image zone to be corrected by the corrected representation of the image zone to be corrected, so as to obtain a transformed image zone.

23. A system according to claim 20, further comprising:

calculating means for calculating, from the transformed image, an image having a controlled noise level, by employing a function whose purpose is to modify brightness of the digital image and which has, as arguments, at least:

the brightness of a point of the transformed digital image, the brightnesses of a zone around the corresponding point of the digital image, the characteristic noise data.

24. A system according to claim 14, wherein the formatted information depends on values of variable characteristics depending on the digital image, the system further comprising:

calculating means for determining the value or values of the variable characteristics for the digital image.

25. A system according to claim 14, to calculate a transformed image from a digital image and from formatted information related to the defects of an appliance chain containing at least one image-restitution appliance, the restitution appliance having a dynamic range, the transformed image having a dynamic range, the system further comprising:

data-processing means for adapting the dynamic range of the transformed image to the dynamic range of the restitution appliance.

* * * * *